(12) United States Patent
Huang et al.

(10) Patent No.: US 11,064,535 B2
(45) Date of Patent: Jul. 13, 2021

(54) RANDOM ACCESS METHOD AND APPARATUS

(71) Applicant: CLOUDMINDS (SHENZHEN) ROBOTICS SYSTEMS CO., LTD., Shenzhen (CN)

(72) Inventors: William Xiao-Qing Huang, Shenzhen (CN); Haitao Jiang, Shenzhen (CN); Zhenkai Wang, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 83 days.

(21) Appl. No.: 16/586,844

(22) Filed: Sep. 27, 2019

(65) Prior Publication Data

US 2020/0029369 A1    Jan. 23, 2020

Related U.S. Application Data

(63) Continuation of application No. PCT/CN2017/079390, filed on Apr. 1, 2017.

(51) Int. Cl.
*H04W 74/08* (2009.01)
*H04W 72/00* (2009.01)
(Continued)

(52) U.S. Cl.
CPC ..... *H04W 74/0833* (2013.01); *H04W 72/005* (2013.01); *H04W 72/0453* (2013.01);
(Continued)

(58) Field of Classification Search
CPC ............ H04W 72/005; H04W 74/006; H04W 74/0833; H04W 72/0453; H04W 56/001; H04L 5/0048; H04B 17/318
See application file for complete search history.

(56) References Cited

U.S. PATENT DOCUMENTS 10,433,291 B2 * 10/2019 Radulescu ............ H04W 48/00
2016/0119831 A1 * 4/2016 Deng ................ H04W 36/0069
455/436
(Continued)

FOREIGN PATENT DOCUMENTS

CN    101132621 A    2/2008
CN    101998660 A    3/2011
(Continued)

OTHER PUBLICATIONS

Extended European Search Report for the corresponding EP application No. 17902696.8, dated Feb. 20, 2020, 8 pages total.
(Continued)

*Primary Examiner* — Brian D Nguyen

(57) ABSTRACT

The present disclosure provides a random access method and apparatus. The method comprises: receiving random access resource selection criterion information and random access resource information broadcasted by a network side device; determining, from the random access resource information, target random access resource information corresponding to the random access resource selection criterion information; and initiating a random access request to the network side device according to the target random access resource information.

18 Claims, 3 Drawing Sheets

(51) Int. Cl.
*H04W 72/04* (2009.01)
*H04B 17/318* (2015.01)
*H04L 5/00* (2006.01)
*H04W 56/00* (2009.01)

(52) U.S. Cl.
CPC .......... *H04B 17/318* (2015.01); *H04L 5/0048* (2013.01); *H04W 56/001* (2013.01)

(56) References Cited

U.S. PATENT DOCUMENTS

| | | |
|---|---|---|
| 2016/0192376 A1 | 6/2016 | Lee et al. |
| 2016/0295609 A1 | 10/2016 | Vajapeyam et al. |
| 2017/0251499 A1* | 8/2017 | Radulescu .......... H04L 41/0866 |
| 2018/0191859 A1* | 7/2018 | Sharma .................. H04L 67/38 |
| 2019/0191466 A1* | 6/2019 | Xu ........................ H04W 76/18 |

FOREIGN PATENT DOCUMENTS

| | | | |
|---|---|---|---|
| CN | 102209391 A | | 10/2011 |
| CN | 104919885 A | | 9/2015 |
| WO | WO 2016/019711 A1 | | 2/2016 |
| WO | WO 2016/190711 A1 | | 12/2016 |

OTHER PUBLICATIONS

Cloudminds (Shenzhen) Robotics Systems Co., Ltd., First Office Action (JP), JP2019-553354, dated Dec. 14, 2020, 3 pgs.

* cited by examiner

RANDOM ACCESS METHOD AND APPARATUS

CROSS-REFERENCE TO RELATED APPLICATIONS

The present application is a continuation of international application No. PCT/CN2017/079390, filed on Apr. 1, 2017, which is incorporated herein by reference in its entirety.

TECHNICAL FIELD

The present disclosure relates to the field of communications, and in particular, to a random access method and apparatus.

BACKGROUND

In 3G and 4G networks, the coverage capability of the uplink coverage of the system is poorer than that of the downlink coverage, which affects the transmission of uplink data. And in 5G network, the difference between the coverage capabilities of the uplink coverage and the downlink coverage is more obvious. Therefore, it is necessary to consider using a high band in cooperation with a low band. That is, when the uplink coverage of the high band itself is limited, the uplink frequency of the low band is used for uplink data transmission, wherein the high band may include frequencies such as 28 GHz and 3.5 GHz for providing capacity, and the low band may include frequencies such as 900 MHz for providing coverage.

Now, the cooperation of the high and low bands generally includes two implementations: one of which adopts a carrier aggregation implementation; and the other relates to a dual connection implementation, that is, the terminal establishes communication connections with the master service network side device and the slave service network side device respectively. However, regardless of the implementation employed, a master service network side device and a slave service network side device have to be configured for the terminal, and the time for the configuration has to be 20 ms-50 ms and configuration delay thereof is long, resulting in a longer data transmission delay. However, for sudden packet services relating to OTT business, car networking, Internet of Things and the like, requirement on data transmission delay is high. Therefore, long data transmission delay cannot meet the requirement on the data transmission delay of these services.

SUMMARY

In order to solve the above problem, the present disclosure provides a random access method and apparatus.

In order to achieve the above object, according to a first aspect of an embodiment of the present disclosure, a random access method is provided, which is applied to a terminal and includes: receiving random access resource selection criterion information and random access resource information broadcasted by a network side device; determining, from the random access resource information, target random access resource information corresponding to the random access resource selection criterion information; initiating a random access request to the network side device according to the target random access resource information.

According to a second aspect of an embodiment of the present disclosure, a random access method is provided, which is applied to a network side device and includes: determining random access resource selection criterion information and random access resource information; broadcasting the random access resource selection criterion information and the random access resource information, so that the terminal determines target random access resource information from the random access resource information according to the random access resource selection criterion information and initiates a random access request to the network side device according to the target random access resource information.

According to a third aspect of an embodiment of the present disclosure, a random access apparatus is provided, which is applied to a terminal and includes: an information receiving module for receiving random access resource selection criterion information and random access resource information broadcasted by a network side device; an information selection module for determining, from the random access resource information, target random access resource information corresponding to the random access resource selection criterion information; a random access module for initiating a random access request to the network side device according to the target random access resource information.

According to a fourth aspect of an embodiment of the present disclosure, a random access apparatus is provided, which is applied to a network side device and includes: an information determining module for determining random access resource selection criterion information and random access resource information; an information broadcasting module for broadcasting the random access resource selection criterion information and the random access resource information, so that the terminal determines target random access resource information from the random access resource information according to the random access resource selection criterion information and initiates a random access request to the network side device according to the target random access resource information.

According to a fifth aspect of an embodiment of the present disclosure, a non-transitory computer readable storage medium is provided, which includes one or more programs for executing the method according to the above first aspect.

According to a sixth aspect of an embodiment of the present disclosure, a terminal is provided, which includes the non-transitory computer readable storage medium according to the above fifth aspect; and one or more processors for executing the program in the non-transitory computer readable storage medium.

According to a seventh aspect of an embodiment of the present disclosure, a non-transitory computer readable storage medium is provided, which includes one or more programs for executing the method according to the above first aspect.

According to an eighth aspect of an embodiment of the present disclosure, a network side device is provided, which includes the non-transitory computer readable storage medium according to the above seventh aspect; and one or more processors for executing the program in the non-transitory computer readable storage medium.

By adopting the above technical solutions, random access resource selection criterion information and random access resource information broadcasted by a network side device are received, target random access resource information corresponding to the random access resource selection criterion information is determined from the random access resource information, a random access request is initiated to the network side device according to the target random access resource information. In this way, the terminal can receive the random access resource selection criterion information and the random access resource information broadcasted by the network side device and determine the target random access resource information for initiating the random access request from the random access resource information, without performing configuration for carrier aggregation or dual connection, which improves the efficiency of random access.

DETAILED DESCRIPTION

Specific embodiments of the present disclosure will be described in details below in connection with the accompanying drawings. It is to be understood that the specific embodiments are described herein for describing and explaining the present disclosure only but are not intended to limit the present disclosure.

The technical solutions provided by the following embodiments of the present disclosure may be applied to a 5G mobile communication system. The system may include a network side device and a terminal. The network side device may be a base station (shorted as BS), wherein the base station is a device that communicates with the terminal, and it may provide communication coverage to a specific physical area. For example, the base station may specifically be an evolved base station (Evolved node B, shorted as ENB or eNodeB) in LTE, or may also be another access network device in the wireless communication network that provides access services.

Terminals may be distributed throughout the mobile communication system, and each terminal may be static or mobile. For example, the terminal may be a mobile station, a subscriber unit, a station, and may also be a wireless communication device such as a cellular phone, a personal digital assistant (abbreviated as PDA), a handheld device, a laptop computer and the like.

Figure 1:
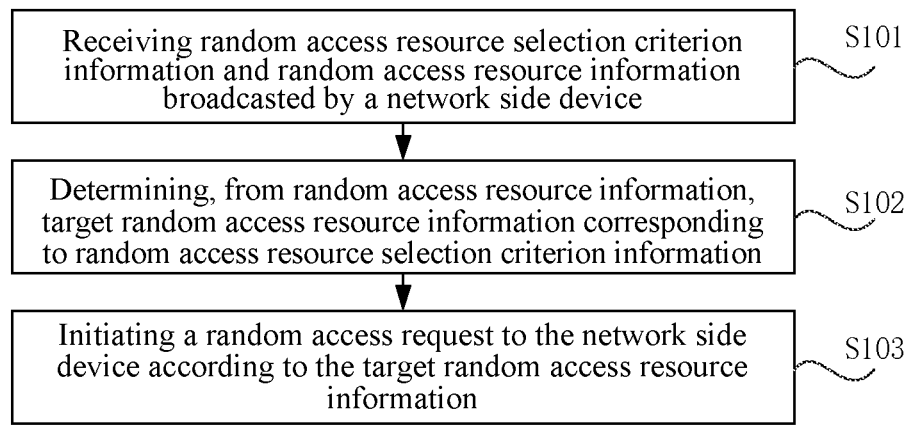
FIG. 1 is a schematic flow chart of a random access method provided by an embodiment of the present disclosure.

FIG. 1 is a random access method provided by an embodiment of the present disclosure, as shown in FIG. 1, the method is applied to a terminal, which includes:

S101, receiving random access resource selection criterion information and random access resource information broadcasted by a network side device.

The random access resource information includes a carrier frequency identification of a carrier frequency within at least one uplink frequency range supported by the network side device or a center frequency of an uplink carrier within the at least one uplink frequency range; the random access resource selection criterion information includes a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

It shall be noted that the network side device may perform pairing of the uplink frequency ranges and the downlink frequency ranges according to working band capability supported by the network side device.

The pairing may be formed by pairing a high frequency TDD (Time Division Duplexing)/FDD (Frequency Division Duplexing) band and a low frequency FDD/TDD band.

Specifically, according to the working band capability supported by the network side device, the above pairing may be a pairing of a high frequency TDD downlink frequency range and a high frequency TDD uplink frequency range; or a pairing of a high frequency TDD downlink frequency range and a high frequency FDD uplink frequency range; or a pairing of a high frequency TDD downlink frequency range and a low frequency FDD uplink frequency range; or a pairing of a high frequency TDD downlink frequency range and a low frequency TDD uplink frequency range; or a pairing of a high frequency FDD downlink frequency range and a high frequency TDD uplink frequency range; or a pairing of a high frequency FDD downlink frequency range and a high frequency FDD uplink frequency range; or a pairing of a high frequency FDD downlink frequency range and a low frequency FDD uplink frequency range; or a pairing of a high frequency FDD downlink frequency range and a low frequency TDD uplink frequency range; or a pairing of a low frequency TDD downlink frequency range and a low frequency TDD uplink frequency range; or a pairing of a low frequency TDD downlink frequency range and a low frequency FDD uplink frequency range; or a pairing of a low frequency FDD downlink frequency range and a low frequency TDD uplink frequency range; or a pairing of a low frequency FDD downlink frequency range and a low frequency FDD uplink frequency range.

Taking a 5G network as an example, in the 5G network, the coverage capability of the uplink coverage of the system is poorer than that of the downlink coverage and the difference is obvious. Therefore, it may be considered to use a high band in cooperation with a low band. That is, when the uplink coverage of the high band itself is limited, the uplink frequency of the low band is used for uplink data transmission. In this way, in the 5G network, the selected paring of bands may specifically be:

a pairing of a high frequency TDD downlink frequency range and a low frequency FDD uplink frequency range;

a pairing of a high frequency TDD downlink frequency range and a low frequency TDD uplink frequency range;

a pairing of a high frequency FDD downlink frequency range and a low frequency FDD uplink frequency range;

a pairing of a high frequency FDD downlink frequency range and a low frequency TDD uplink frequency range.

That is, when performing pairing, a high band is selected as a downlink frequency range and a low band is selected as an uplink frequency range. In this way, when the uplink coverage of the high band itself is limited, the uplink frequency of the low band may be used for uplink data transmission, so as to enhance coverage capability.

In this step, the information on the above paired frequency range supported by the network side device may be transmitted to the terminal through the random access resource selection criterion information.

S102, determining, from the random access resource information, target random access resource information corresponding to the random access resource selection criterion information.

S103, initiating a random access request to the network side device according to the target random access resource information.

In this step, the random access request may be initiated to the network side device over the uplink frequency range or the uplink carrier in the target random access resource information.

In this way, the terminal may receive the random access resource selection criterion information and the random access resource information broadcasted by the network side device and determine the target random access resource information for initiating the random access request from the random access resource information, without performing configuration for carrier aggregation or dual connection, which improves the efficiency of random access.

Figure 2:
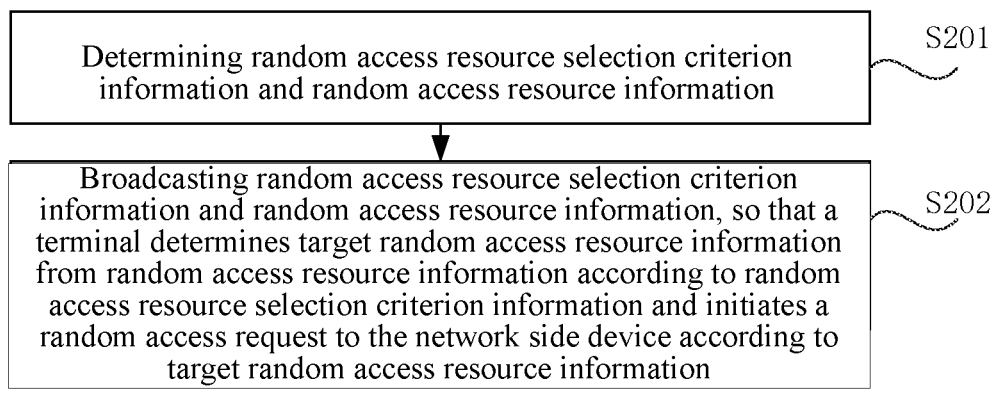
FIG. 2 is a schematic flow chart of another random access method provided by an embodiment of the present disclosure.

FIG. 2 is a random access method provided by an embodiment of the present disclosure, as shown in FIG. 2, the method is applied to a network side terminal and includes:

S201, determining random access resource selection criterion information and random access resource information.

The random access resource information includes a carrier frequency identification of a carrier frequency within at least one uplink frequency range supported by the network side device or a center frequency of an uplink carrier within the at least one uplink frequency range; the random access resource selection criterion information includes a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

S202, broadcasting the random access resource selection criterion information and the random access resource information, so that the terminal determines target random access resource information from the random access resource information according to the random access resource selection criterion information and initiates a random access request to the network side device according to the target random access resource information.

In this way, the network side device may broadcasts the random access resource selection criterion information and the random access resource information, so that the terminal receive the random access resource selection criterion information and the random access resource information broadcasted by the network side device and determine the target random access resource information for initiating the random access request from the random access resource information, without performing configuration for carrier aggregation or dual connection, which improves the efficiency of random access.

Figure 3:
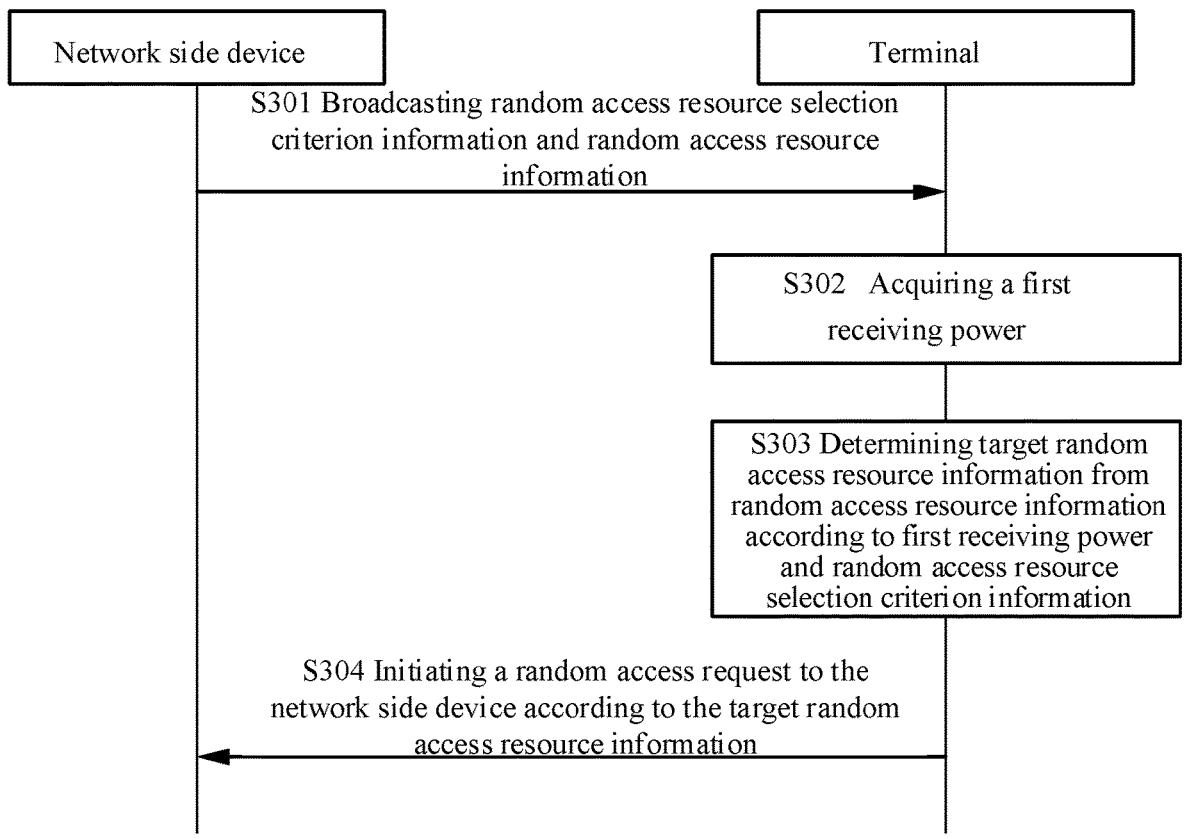
FIG. 3 is a schematic flow chart of a third random access method provided by an embodiment of the present disclosure.

In order to enable a person skilled in the art to more clearly understand the technical solutions provided by the embodiments of the present disclosure, the method for random access provided by the embodiments of the present disclosure is described in details below in connection with the terminal and the network side device. As shown in FIG. 3, the method includes:

S301, the network side device broadcasts the random access resource selection criterion information and the random access resource information, over the target downlink carrier within the downlink frequency range supported by the network side device.

The random access resource information includes a carrier frequency identification of a carrier frequency within at least one uplink frequency range supported by the network side device or a center frequency of an uplink carrier within the at least one uplink frequency range; the random access resource selection criterion information includes a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level. The larger the random access resource selection criteria threshold, the smaller the uplink coverage range of the corresponding uplink frequency range or uplink carrier or network coverage level is.

The target downlink carrier within the downlink frequency range is configured by a network management system or the network side device according to network coverage capability of a carrier within the downlink frequency range within the first band set; and/or The target downlink carrier within the downlink frequency range is configured by the network management system or the network side device according to load status of a carrier within the downlink frequency range supported by the network side device.

In this step, the network side device may acquire the random access resource selection criteria threshold through the following step S11 to step S12:

S11, the network side device acquires a first transmission power for the network side device to send the reference signal or the synchronization signal over the target downlink carrier within the downlink frequency range, and a lowest receiving power corresponding to the network side device for demodulating the uplink data when the terminal sends the uplink data over the uplink frequency range supported by the network side device.

S12, the network side device acquires a loss difference value between an uplink path loss value of the terminal and the network side device over the uplink frequency range, and a downlink path loss value of the terminal and the network side device over the target downlink carrier.

The uplink path loss value and the downlink path loss value are path loss values obtained by the terminal at the same geographical position. The uplink path loss value and the downlink path loss value may be obtained by measurement of a frequency spectrum analyzer. Alternatively, the uplink path loss value and the downlink path loss value may also be obtained by calculation according to a classical propagation model and frequencies of the i-th second downlink band and the first downlink band. For example, in a dense urban area, the classical propagation model may be a Hata propagation model. The specific procedure for calculating the path loss values according to the model is the same as that in the prior art and will not be described here.

S13, the network side device determines all power levels of the terminal corresponding to the at least one uplink frequency range.

For example, the terminal may support 3 power levels in one uplink frequency range, and then the uplink coverage receiving threshold power corresponding to each power level of the terminal in the one uplink frequency range may be calculated through the subsequent step S14.

S14, a random access resource information selection threshold power corresponding to each uplink frequency range is obtained though the following formula according to the first receiving power, the lowest receiving power, the loss difference value and all the power levels:

$$RSRP_{thres} = P_{tx\_1} + PL_{delta} + P_{RX\_i} - P_{UL\_i}$$

where, $RSRP_{thres}$ represents the random access resource information selection threshold power corresponding to the i-th uplink frequency range, $P_{tx\_1}$ represents the first receiving power, $PL_{delta}$ represents the loss difference value between the uplink path loss value of the terminal and the network side device over the i-th uplink target carrier and a downlink path loss value of the terminal and the network side device over the target downlink carrier, $P_{RX\_i}$ represents the lowest receiving power corresponding to the network side device for demodulating the uplink data when the uplink data are sent over the i-th uplink target carrier supported by the network side device, and $P_{UL\_i}$ represents the maximum transmission power corresponding to any one of all the power levels of the i-th uplink target carrier.

The power level represents the maximum transmission power of the terminal over the uplink working band supported by the network side device; the maximum transmission powers correspond to the longest reachable distances of the signals sent by different terminals. The longest reachable distances are different for the terminals at different power levels. The maximum transmission powers corresponding to the different power levels may be configured according to configurations (such as the application scenarios and costs) that is set while designing the terminals and the like. The terminal may only support one power lever in a certain band.

For example, the terminal can support 3 power levels (corresponding to the all power levels), where, when the power level of the maximum transmission power of the terminal at the 900 MHz band is 1, the corresponding maximum transmission power is 23 dBm; when the power level of the maximum transmission power of the terminal at the 900 MHz band is 2, the corresponding maximum transmission power is 26 dBm; when the power level of the maximum transmission power of the terminal at the 900 MHz band is 3, the corresponding maximum transmission power is 14 dBm; when the power level of the maximum transmission power of the terminal at the 3.5 GHz band is 1, the corresponding maximum transmission power is 20 dBm; when the power level of the maximum transmission power of the terminal at the 3.5 GHz band is 2, the corresponding maximum transmission power is 23 dBm; when the power level of the maximum transmission power of the terminal at the 3.5 GHz band is 3, the corresponding maximum transmission power is 26 dBm.

It should be noted that, after the random access resource selection criteria threshold is obtained, the network side device may determine manners for representing the random access resource selection criteria threshold included in the random access resource selection criterion information according to information on the defined terminal power level.

The information on the defined terminal power level is configured for representing that the terminal supports a single power level over the at least one uplink frequency range; or representing that the terminal supports a plurality of power levels over the at least one uplink frequency range. In a possible implementation, level configuration information may be determined by the network side device according to the situation of the power levels defined in the supported 3GPP standard version. For example, only one type of power level was defined for the terminal in the standard of the version Release 14, and then it is determined that the power level configuration information represents that the terminal supports a single power level over the at least one uplink frequency range. And 3 types of power levels were defined for the terminal in the version Release 15, that is, there are 3 types of power levels for the terminal in the power levels of each uplink frequency range, and then it is determined that the power level configuration information represents that the terminal supports a plurality of power levels over the at least one uplink frequency range.

According to the difference of the above power level configuration information, the manners for representing the random access resource selection criteria threshold included in the random access resource selection criterion information may include the following two:

Manner 1: When the terminal supports a single power level over the at least one uplink frequency range, the random access resource selection criterion information includes a random access resource selection criteria threshold corresponding to the terminal over the at least one uplink frequency range or on at least one network coverage level, the number of the random access resource selection criteria thresholds are equal to the number of the uplink frequency ranges minus 1 or equal to the number of the uplink carriers minus 1 or equal to the number of the network coverage levels minus 1.

It should be noted that, threshold powers for broadcasting are selected according to the random access resource selection criteria thresholds in a descending order.

For example, if the network side device supports 3 uplink frequency ranges and the single power level supported by the terminal over each uplink frequency range is power level 2, the random access resource selection criteria thresholds corresponding to the 3 uplink frequency ranges are R1, R2, R3, respectively. R1 represents a random access resource selection criteria threshold corresponding to the terminal over the uplink frequency range 1 when the power level is 2, R2 represents a random access resource selection criteria threshold corresponding to the terminal over the uplink frequency range 2 when the power level is 2, R3 represents a corresponding random access resource selection criteria threshold corresponding to the terminal over the uplink frequency range 3 when the power level is 2, and R1≥R2≥R3. Then, the uplink coverage receiving threshold information may be (R1, R2).

Manner 2: When the terminal supports a plurality of power levels over the at least one uplink frequency range, then the random access resource selection criterion information includes a threshold sequence, the threshold sequence includes a plurality of threshold elements, each threshold element corresponds in one on one correspondence to one of all the level combinations of the power levels corresponding to the terminal over each uplink frequency range or each uplink carrier or each network coverage level supported by the network side device, and each threshold element includes a second random access resource selection criteria threshold in the random access resource selection criteria thresholds corresponding to the power levels of the terminal over the uplink frequency range or the uplink carrier or the network coverage level supported by the network side device;

The number of the plurality of threshold elements is $A^B$, A represents the number of the uplink frequency ranges or the uplink carriers or the network coverage levels supported by the network side and B represents the number of the power levels of the terminal over the uplink frequency ranges or the uplink carriers or the network coverage levels; the number of the second random access resource selection criteria thresholds included in each threshold element is the number of the uplink carriers or the network coverage levels or the number of the uplink frequency ranges supported by the network side device minus 1;

For example, if the network side device supports 3 uplink frequency ranges, the terminal supports 3 power levels over each uplink frequency range, and the uplink coverage receiving threshold information delivered by the network side device needs consider the situation of 3 (corresponding to A) uplink frequency ranges and 3 power levels (corresponding to B) supported by the terminal over the uplink frequency ranges, then the number of the plurality of threshold elements is $3^3=27$, and each threshold element corresponds to a combination of the different power levels within the 3 uplink frequency ranges, such as (C1, C2 . . . C27), wherein C1 is the threshold element corresponding to a combination of power level 1 of the terminal over the uplink frequency range 1, power level 1 of the terminal over the uplink frequency range 2 and power level 1 of the terminal over the uplink frequency range 3, the random access resource selection criteria threshold corresponding to the power level 1 of the terminal over the uplink frequency range 1 is T1, the random access resource selection criteria threshold corresponding to the power level 1 of the terminal over the uplink frequency range 2 is T2, and the random access resource selection criteria threshold corresponding to the power level 1 of the terminal over the uplink frequency range 3 is T3, wherein T1≥T2≥T3, and then the threshold element C1 may include the random access resource selection criteria threshold T1 corresponding to the power level 1 of the terminal over the uplink frequency range 1 and the random access resource selection criteria threshold T2 corresponding to the power level 1 of the terminal over the uplink frequency range 2. Similarly, C2 is the threshold element corresponding to a combination of power level 1 of the terminal over the uplink frequency range 1, power level 1 of the terminal over the uplink frequency range 2 and power level 2 of the terminal over the uplink frequency range 3, the random access resource selection criteria threshold corresponding to the power level 1 of the terminal over the uplink frequency range 1 is T1, the random access resource selection criteria threshold corresponding to the power level 1 of the terminal over the uplink frequency range 2 is T2, and the random access resource selection criteria threshold corresponding to the power level 2 of the terminal over the uplink frequency range 3 is T4, wherein T1≥T2≥T4, and then the threshold element C1 may include the random access resource selection criteria threshold T1 corresponding to the power level 1 of the terminal over the uplink frequency range 1 and the random access resource selection criteria threshold T2 corresponding to the power level 1 of the terminal over the uplink frequency range 2. Similarly, the random access resource selection criteria thresholds included in each threshold element may be obtained.

S302, the terminal receives, the random access resource selection criterion information and the random access resource information, and acquires a first receiving power for the terminal to receive a downlink reference signal or a downlink synchronization signal over the target downlink carrier.

S303, the terminal determines the target random access resource information from the random access resource information according to the first receiving power and the random access resource selection criterion information.

In this step, the two manners for representing the random access resource selection criterion information according to step S301 may include the following two manners for determining the target random access resource information:

Manner 1: when the terminal supports a single power level over the at least one uplink frequency range, acquiring, from the uplink coverage receiving threshold information, the random access resource selection criteria threshold corresponding to the power level of the terminal over the at least one uplink frequency range or the at least one uplink carrier or the at least one network coverage level, and determining the target random access resource information according to the first receiving power and the random access resource selection criteria threshold.

In a possible implementation, the terminal may determine whether the first receiving power is larger than or equal to a first random access resource selection criteria threshold of the random access resource selection criteria thresholds sequentially in accordance with a first preset order, and when the first receiving power is larger than or equal to a first random access resource selection criteria threshold, determine the random access resource information corresponding to the first random access resource selection criteria threshold as the target random access resource information. Where, the first preset order is a descending order of the first random access resource selection criteria thresholds.

For example, if the uplink frequency ranges supported by the network side device are as follows: uplink frequency range 1 of 4400-4500 MHz, uplink frequency range 2 of 3300-4200 MHz, uplink frequency range 3 of 1710-1785 MHz, where the random access resource selection criteria threshold corresponding to the uplink frequency range 1 is R1, the random access resource selection criteria threshold corresponding to the uplink frequency range 2 is R2, the random access resource selection criteria threshold corresponding to the uplink frequency range 3 is R3, and R1≥R2≥R3, then the random access resource selection criterion information includes (R1, R2), where R1 and R2 are the first random access resource selection criteria thresholds. Thus, when the first receiving power is larger than or equal to R1, the random access resource information corresponding to the uplink frequency range 1 is determined as the target random access resource information; and when the first receiving power is smaller than R1, it is determined whether the first receiving power is larger than or equal to R2. When the first receiving power is larger than or equal to R2, the random access resource information corresponding to the uplink frequency range 2 is determined as the target random access resource information; and when the first receiving power is smaller than R2, the random access resource information corresponding to the uplink frequency range 3 is determined as the target random access resource information.

In another possible implementation, the terminal may determine whether the first receiving power is smaller than or equal to a first random access resource selection criteria threshold of the random access resource selection criteria thresholds sequentially in accordance with a second preset order, and when the first receiving power is smaller than or equal to a first random access resource selection criteria threshold, determine the random access resource information corresponding to the first random access resource selection criteria threshold as the target random access resource information. Where the second preset order is an ascending order of the first random access resource selection criteria thresholds.

For example, if the uplink frequency ranges supported by the network side device are as follows: uplink frequency range 1 of 4400-4500 MHz, uplink frequency range 2 of 3300-4200 MHz, uplink frequency range 3 of 1710-1785 MHz, where the random access resource selection criteria threshold corresponding to the uplink frequency range 1 is R1, the random access resource selection criteria threshold corresponding to the uplink frequency range 2 is R2, the random access resource selection criteria threshold corresponding to the uplink frequency range 3 is R3, and R1≥R2≥R3, then the random access resource selection criterion information includes (R1, R2), where R1 and R2 are the first random access resource selection criteria thresholds. Thus, when the first receiving power is smaller than or equal to R2, the random access resource information corresponding to the uplink frequency range 3 is determined as the target random access resource information; and when the first receiving power is larger than R2, it is determined whether the first receiving power is larger than or equal to R1. When the first receiving power is smaller than or equal to R1, the random access resource information corresponding to the uplink frequency range 2 is determined as the target random access resource information; and when the first receiving power is larger than R1, the random access resource information corresponding to the uplink frequency range 1 is determined as the target random access resource information.

Thus, when the first receiving power is smaller than or equal to R2, the random access resource information corresponding to the uplink frequency range 3 is determined as the target random access resource information, and when the first receiving power is larger than R2, it is determined whether the first receiving power is smaller than or equal to R1, and when the first receiving power is smaller than or equal to R1, the random access resource information corresponding to the uplink frequency range 2 is determined as the target random access resource information and when the first receiving power is larger than R1, the random access resource information corresponding to the uplink frequency range 1 is determined as the target random access resource information.

Manner 2: when the terminal supports a plurality of power levels over the at least one uplink frequency ranges, the terminal may acquire the power levels of the terminal over the at least one uplink frequency range or the at least one uplink carrier or the at least one network coverage level, determine a target threshold element from the plurality of threshold elements according to the power levels, and determine a target random access resource information from the random access resource information according to the first receiving power and the target threshold element.

For example, the example of the random access resource selection criterion information being (C1, C2 . . . C27) in the above step S301 will be illustrated again. If the power level of the terminal over the uplink frequency range 1 is 1, the power level of the terminal over the uplink frequency range 2 is 1 and the power level of the terminal over the uplink frequency range 3 is 1, then C1 is determined as the target threshold element. If the power level of the terminal over the uplink frequency range 1 is 1, the power level of the terminal over the uplink frequency range 2 is 1 and the power level of the terminal over the uplink frequency range 3 is 2, then C2 is determined as the target threshold element.

After determining the target threshold element, the terminal may determining target access parameters through the following two possible implementations:

In a possible implementation, the terminal may determine whether the first receiving power is larger than or equal to second random access resource selection criteria thresholds in the target threshold element sequentially in accordance with a third preset order; and when the first receiving power is larger than or equal to the second random access resource selection criteria threshold, determine the random access resource information corresponding to the second random access resource selection criteria threshold as the target random access resource information.

The third preset order is a descending order of the second random access resource selection criteria thresholds.

For example, if the target threshold element is C1, the random access resource selection criteria threshold corresponding to the power level 1 of the terminal over the uplink frequency range 1 is T1, the random access resource selection criteria threshold corresponding to the power level 1 of the terminal on the uplink frequency range 2 is T2, and the random access resource selection criteria threshold corresponding to the power level 1 of the terminal on the uplink frequency range 3 is T3, and T1≥T2≥T3; then C1 includes (T1, T2), where T1 and T2 are the second random access resource selection criteria thresholds. Thus, when the first receiving power is larger than or equal to T1, the random access resource information corresponding to the uplink frequency range 1 is determined as the target random access resource information, and when the first receiving power is smaller than T1, it is determined whether the first receiving power is larger than or equal to T2. When the first receiving power is larger than or equal to T2, the random access resource information corresponding to the uplink frequency range 2 is determined as the target random access resource information and when the first receiving power is smaller than T2, the random access resource information corresponding to the uplink frequency range 3 is determined as the target random access resource information.

In another possible implementation, the terminal may determine whether the first receiving power is smaller than or equal to second random access resource selection criteria thresholds in the target threshold elements sequentially in accordance with a fourth preset order; and when the first receiving power is smaller than or equal to a second random access resource selection criteria threshold, determine the random access resource information corresponding to the second random access resource selection criteria threshold as the target random access resource information.

The fourth preset order is an ascending order of the second random access resource selection criteria thresholds.

For example, if the target threshold element is C1, the random access resource selection criteria threshold corresponding to the power level 1 of the terminal over the uplink frequency range 1 is T1, the random access resource selection criteria threshold corresponding to the power level 1 of the terminal over the uplink frequency range 2 is T2, and the random access resource selection criteria threshold corresponding to the power level 1 of the terminal over the uplink frequency range 3 is T3, and T1≥T2≥T3, then C1 includes (T1, T2), wherein T1 and T2 are the second random access resource selection criteria thresholds. Thus, when the first receiving power is smaller than or equal to T2, the random access resource information corresponding to the uplink frequency range 3 is determined as the target random access resource information, and when the first receiving power is larger than T2, it is determined whether the first receiving power is smaller than or equal to T1. When the first receiving power is smaller than or equal to T1, the random access resource information corresponding to the uplink frequency range 2 is determined as the target random access resource information and when the first receiving power is larger than T1, the random access resource information corresponding to the uplink frequency range 1 is determined as the target random access resource information.

S304, the terminal initiates a random access request to the network side device according to the target random access resource information.

The target random access resource information includes a carrier frequency identification within at least one uplink frequency range supported by the network side device or a center frequency of a target uplink carrier within the at least one uplink frequency range, and information on random access request sequence format, random access request transmission time and so on. Thus, the terminal may initiate a random access request to the network side device over center frequency of the target uplink carrier according to the target random access resource information.

By adopting the above method, the terminal may receive the random access resource selection criterion information and the random access resource information broadcasted by the network side device and determine the target random access resource information for initiating the random access request from the random access resource information, without performing configuration for carrier aggregation or dual connection, which improves the efficiency of random access.

It should be noted that, for the sake of simple description, the foregoing method embodiments are all expressed as a series of action combinations, but those skilled in the art should understand that the present disclosure is not limited by the described action sequence, because in accordance with the present disclosure, certain steps may be performed in other orders or concurrently. In addition, those skilled in the art should also understand that the embodiments described in the specification are all preferred embodiments, and the actions and modules involved are not necessarily required by the present disclosure.

Figure 4:
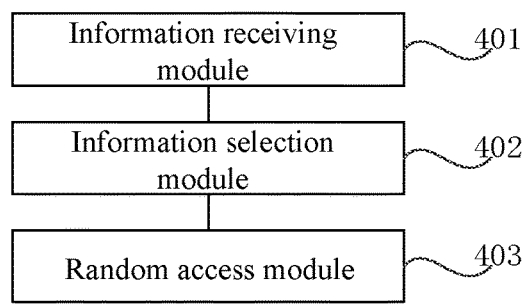
FIG. 4 is a schematic structure diagram of a random access apparatus provided by an embodiment of the present disclosure.

FIG. 4 is a random access apparatus provided by an embodiment of the present disclosure, as shown in FIG. 4, the random access apparatus is applied to the terminal and includes:

an information receiving module 401 for receiving random access resource selection criterion information and random access resource information broadcasted by a network side device;

an information selection module 402 for determining, from the random access resource information, target random access resource information corresponding to the random access resource selection criterion information;

a random access module 403 for initiating a random access request to the network side device according to the target random access resource information.

Alternatively, the random access resource information includes the random access resource information comprises a carrier frequency identification within at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

Alternatively, the information receiving module 401 is configured for receiving the random access resource selection criterion information and the random access resource information broadcasted by the network side device over a target downlink carrier within a downlink frequency range supported by the network side device.

Alternatively, the target downlink carrier within the downlink frequency range is configured by a network management system or the network side device according to network coverage capability of a carrier within the downlink frequency range supported by the network side device; and/or the target downlink carrier within the downlink frequency range is configured by a network management system or the network side device according to load status of a carrier within the downlink frequency range supported by the network side device.

Alternatively, the information selection module 402 is configured for acquiring a first receiving power for the terminal to receive a downlink reference signal or a downlink synchronization signal by the terminal over the target downlink carrier; and determining the target random access resource information from the random access resource information according to the first receiving power and the random access resource selection criterion information, wherein, the target random access resource information comprises frequency identification of the target uplink carrier, and the random access resource selection criterion information is characterized by the first receiving power.

Alternatively, the information selection module 402 is configured for acquiring, from the random access resource selection criterion information, a random access resource selection criteria threshold corresponding to the terminal over the at least one uplink frequency range or over at least one network coverage level, and determining the target random access resource information from the random access resource information according to the first receiving power and the random access resource selection criteria threshold; wherein, the number of the random access resource selection criteria threshold is equal to the number of the uplink frequency ranges minus 1 or equal to the number of the uplink carriers minus 1 or equal to the number of the network coverage levels minus 1.

Alternatively, the information selection module 402 is configured for is configured for determining whether the first receiving power is larger than or equal to each of first random access resource selection criteria thresholds of the random access resource selection criteria thresholds sequentially in accordance with a first preset order; and when the first receiving power is larger than or equal to a first random access resource selection criteria threshold, determining the random access resource information corresponding to the first random access resource selection criteria threshold as the target random access resource information, wherein the first preset order is a descending order of the first random access resource selection criteria thresholds.

Alternatively, the information selection module 402 is configured for determining whether the first receiving power is smaller than or equal to first random access resource selection criteria thresholds of the random access resource selection criteria thresholds sequentially in accordance with a second preset order; and when the first receiving power is smaller than or equal to a first random access resource selection criteria threshold, determining the random access resource information corresponding to the first random access resource selection criteria threshold as the target random access resource information, wherein the second preset order is an ascending order of the first random access resource selection criteria thresholds.

Alternatively, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises a second random access resource selection criteria threshold in the random access resource selection criteria thresholds corresponding to the power level of the terminal over the uplink frequency range or the uplink carrier or the network coverage level supported by the network side device;

The number of the plurality of threshold elements is $A^B$, wherein, A is the number of the uplink frequency ranges or the uplink carriers or the network coverage levels supported at the network side device and B is the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1.

The information selection module 402 is configured for acquiring the power level of the terminal on the at least one uplink frequency range on the at least one uplink carrier on the at least one network coverage level, and determining a target threshold element from the plurality of threshold elements according to the power level, and determining a target random access resource information from the random access resource information according to the first receiving power and the target threshold element.

Alternatively, the information selection module 402 is configured for the information selection module is configured for determining whether the first receiving power is larger than or equal to a second random access resource selection criteria thresholds of the target threshold elements sequentially in accordance with a third preset order; and when the first receiving power is larger than or equal to a second random access resource selection criteria threshold, determining the random access resource information corresponding to the second random access resource selection criteria threshold as the target random access resource information; wherein the third preset order is a descending order of the second random access resource selection criteria thresholds.

Alternatively, the information selection module 402 is configured for determining whether the first receiving power is configured for determining whether the first receiving power is smaller than or equal to a second random access resource selection criteria thresholds of the target threshold elements sequentially in accordance with a fourth preset order; and when the first receiving power is smaller than or equal to a second random access resource selection criteria threshold, determining the random access resource information corresponding to the second random access resource selection criteria threshold as the target random access resource information wherein the fourth preset order is an ascending order of the second random access resource selection criteria thresholds.

By adopting the above apparatus, the terminal may receive the random access resource selection criterion information and the random access resource information broadcasted by the network side device and determine the target random access resource information for initiating the random access request from the random access resource information, without performing configuration for carrier aggregation or dual connection, which improves the efficiency of random access.

It should be noted that, those skilled in the art can clearly understand that the corresponding processes in the foregoing method embodiments may be referred to for understanding the specific working process and description of the above described apparatus, which will not repeated here for the convenience and brevity of the description.

Figure 5:
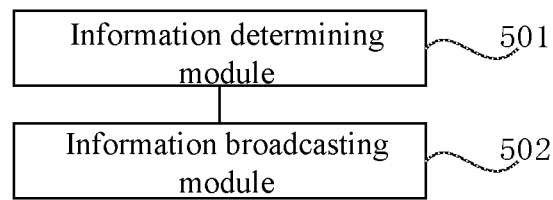
FIG. 5 is a schematic structure diagram of another random access apparatus provided by an embodiment of the present disclosure.

FIG. 5 is a random access apparatus provided by the present disclosure, as shown in FIG. 5, the random access apparatus is applied to a network side device, which includes:

an information determining module 501 for determining random access resource selection criterion information and random access resource information;

an information broadcasting module 502 for broadcasting the random access resource selection criterion information and the random access resource information, so that the terminal determines target random access resource information from the random access resource information according to the random access resource selection criterion information and initiates a random access request to the network side device according to the target random access resource information.

Alternatively, the random access resource information comprises a carrier frequency identification within at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

Alternatively, the information broadcasting module 502 is configured for broadcasting the random access resource selection criterion information and the random access resource information over a target downlink carrier within a downlink frequency range supported by the network side device.

Alternatively, the target downlink carrier within the downlink frequency range is configured by a network management system or the network side device according to network coverage capability of a carrier within the downlink frequency range supported by the network side device; and/or the target downlink carrier within the downlink frequency range is configured by a network management system or the network side device according to load status of a carrier within the downlink frequency range supported by the network side device.

Alternatively, the number of the random access resource selection criteria thresholds included in the random access resource selection criterion information is:

the number of the uplink frequency ranges supported by the network side device minus 1; or the number of the uplink frequency carriers supported by the network side device minus 1; or the number of the network coverage levels supported by the network side device minus 1.

Alternatively, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises a second random access resource selection criteria threshold in the random access resource selection criteria thresholds corresponding to the power level of the terminal over the uplink frequency range or the uplink carrier or the network coverage level supported by the network side device;

the number of the plurality of threshold elements is AB, wherein, A is the number of the uplink frequency ranges or the uplink carriers or the network coverage levels supported at the network side device and B is the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1.

Figure 6:
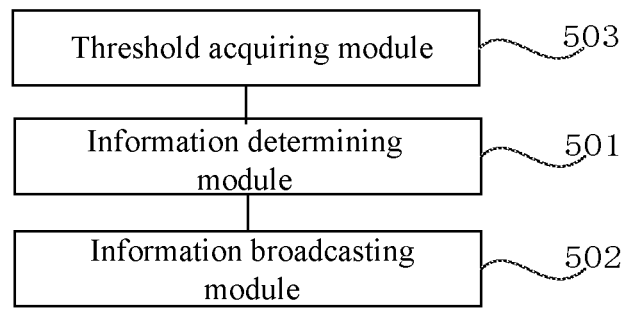
FIG. 6 is a schematic structure diagram of a third random access apparatus provided by an embodiment of the present disclosure.

Alternatively, as shown in FIG. 6, the apparatus further includes:

a threshold acquiring module 503 for acquiring the random access resource selection criteria threshold through the following steps:

acquiring a first transmission power for the network side device to send the reference signal or the synchronization signal over the target downlink carrier within the downlink frequency range, and a lowest receiving power corresponding to the network side device for demodulating the uplink data when the terminal sends the uplink data over the uplink frequency range supported by the network side device;

acquiring a loss difference value between an uplink path loss value of the terminal and the network side device over the uplink frequency range and a downlink path loss value of the terminal and the network side device over the target downlink carrier, wherein the uplink path loss value and the downlink path loss value are path loss values obtained by the terminal at a same geographical position;

determining all power levels corresponding to the terminal over the at least one uplink frequency range; and obtaining a random access resource information selection threshold powers corresponding to each uplink frequency range though the following formula, according to the first receiving power, the lowest receiving power, the loss difference value and all the power levels:

$$RSRP_{thres} = P_{tx\_1} + PL_{delta} + P_{RX\_i} - P_{UL\_i}$$

wherein $RSRP_{thres}$ represents the random access resource information selection threshold power corresponding to the i-th uplink frequency range, $P_{tx\_1}$ represents the first receiving power, $PL_{delta}$ represents the loss difference value between the uplink path loss value of the terminal and the network side device over the i-th uplink target carrier and a downlink path loss value of the terminal and the network side device over the target downlink carrier, $P_{RX\_i}$ represents the lowest receiving power corresponding to the network side device for demodulating the uplink data when the uplink data are sent over the i-th uplink target carrier supported by the network side device, and $P_{UL\_i}$ represents the maximum transmission power corresponding to any one of all the power levels of the i-th uplink target carrier.

By adopting the above apparatus, the network side device may broadcasts the random access resource selection criterion information and the random access resource information, so that the terminal receives the random access resource selection criterion information and the random access resource information broadcasted by the network side device and determines the target random access resource information for initiating the random access request from the random access resource information, without performing configuration for carrier aggregation or dual connection, which improves the efficiency of random access.

It should be noted that, those skilled in the art can clearly understand that the corresponding processes in the foregoing method embodiments may be referred to for understanding specific working process and description of the above described apparatus which will not repeated here for the convenience and brevity of the description.

Figure 7:
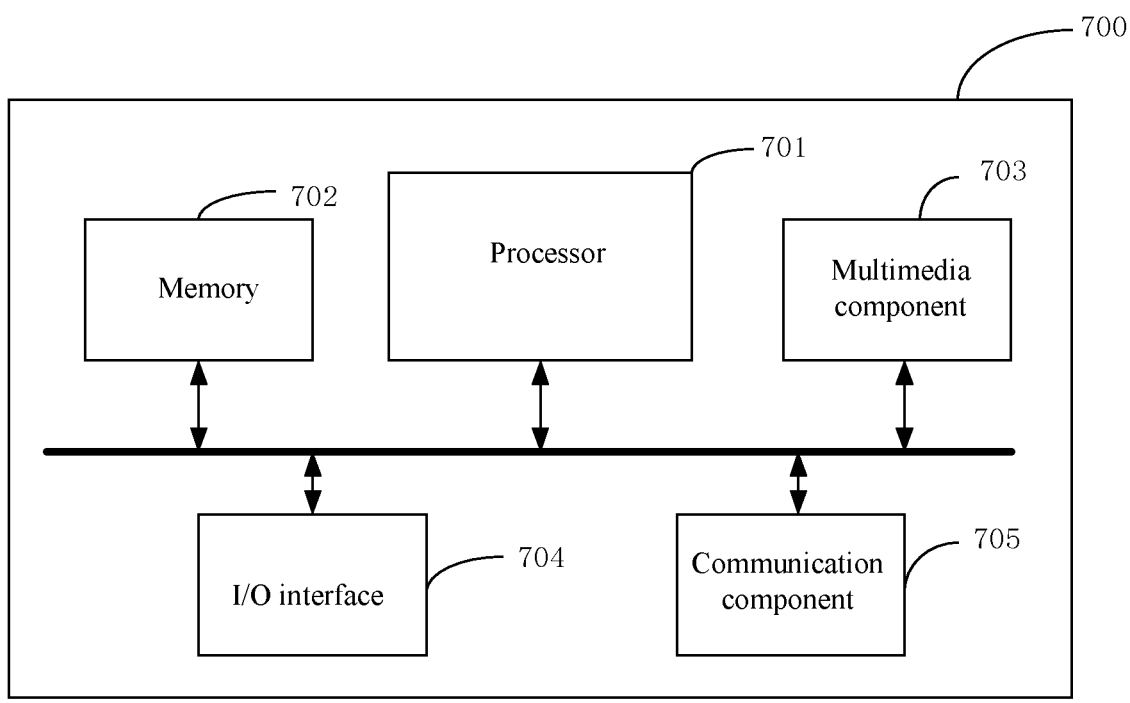
FIG. 7 is a schematic structure diagram of a hardware of a random access apparatus provided by an embodiment of the present disclosure.

FIG. 7 is a block diagram of a random access apparatus provided by an embodiment of the present disclosure, as shown in FIG. 7; the random access apparatus may be applied to the network side device or the terminal. The apparatus 700 may include: a processor 701, a memory 702, a multimedia component 703, an input/output (I/O) interface 704, and a communication component 705.

The processor 701 is configured to control the overall operation of the apparatus 700 to complete all or part of the steps of the above random access method. The memory 702 is configured to store various types of data to support operations at the apparatus 700. The data may include instructions for any application or method operating on the apparatus 700, as well as application related data, such as contact data, messages sent and received, pictures, audios, videos and the like.

The memory 702 may be implemented by any type of volatile or non-volatile storage terminal device or a combination thereof, such as a Static Random Access Memory (shorted as SRAM), an Electrically Erasable Programmable Read-Only Memory (shorted as EEPROM), an Erasable Programmable Read-Only Memory (shorted as EPROM), a Programmable Read-Only Memory (shorted as PROM), a Read-Only Memory (abbreviated as ROM), a magnetic memory, a flash memory, a disk or an optical disk. The multimedia component 703 may include a screen and an audio component. The screen may be for example a touch screen, and the audio component is configured to output and/or input an audio signal. For example, the audio component may include a microphone for receiving an external audio signal. The received audio signal may be further stored in the memory 702 or transmitted via the communication component 705. The audio component also includes at least one speaker for outputting the audio signal. The I/O interface 704 provides an interface between the processor 701 and other interface modules. The above other interface modules may be a keyboard, a mouse, a button and the like. These buttons may be virtual buttons or physical buttons. The communication component 705 is configured for wired or wireless communication between the apparatus 700 and other terminal devices. Wireless communication may be for example Wi-Fi, Bluetooth, Near Field Communication (shorted as NFC), 2G, 3G or 4G or a combination of one or more of them, so that the corresponding communication component 705 may include: a Wi-Fi module, a Bluetooth module, a NFC module.

In an exemplary embodiment, the apparatus 700 may be implemented by one or more Application Specific Integrated Circuits (shorted as ASIC), Digital Signal Processors (shorted as DSP), Digital Signal Processing Terminals Devices (shorted as DSPD), Programmable Logic Devices (shorted as PLD), Field Programmable Gate Arrays (shorted as FPGA), controllers, microcontrollers, microprocessors or other electronic components to perform the above described random access method.

An embodiment of the present disclosure further provides a non-transitory computer readable storage medium 1, which includes one or more programs for executing a random access method, the method includes: receiving random access resource selection criterion information and random access resource information broadcasted by a network side device; determining, from the random access resource information, target random access resource information corresponding to the random access resource selection criterion information; and initiating a random access request to the network side device according to the target random access resource information.

Alternatively, the random access resource information comprises a carrier frequency identification within at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

Alternatively, the receiving random access resource selection criterion information and random access resource information broadcasted by a network side device comprises: receiving the random access resource selection criterion information and the random access resource information broadcasted by the network side device over a target downlink carrier within a downlink frequency range supported by the network side device.

Alternatively, the target downlink carrier within the downlink frequency range is configured by a network management system or the network side device according to network coverage capability of a carrier within the downlink frequency range supported by the network side device; and/or the target downlink carrier within the downlink frequency range is configured by a network management system or the network side device according to load status of a carrier within the downlink frequency range supported by the network side device.

Alternatively, the determining, from the random access resource information, target random access resource information corresponding to the random access resource selection criterion information comprises: acquiring a first receiving power for the terminal to receive a downlink reference signal or a downlink synchronization signal by the terminal over the target downlink carrier; and determining the target random access resource information from the random access resource information according to the first receiving power and the random access resource selection criterion information, wherein, the target random access resource information comprises frequency identification of the target uplink carrier, and the random access resource selection criterion information is characterized by the first receiving power.

Alternatively, the determining the target random access resource information from the random access resource information according to the first receiving power and the random access resource selection criterion information comprises: acquiring, from the random access resource selection criterion information, a random access resource selection criteria threshold corresponding to the terminal over the at least one uplink frequency range or over at least one network coverage level, the number of the random access resource selection criteria threshold is equal to the number of the uplink frequency ranges minus 1 or equal to the number of the uplink carriers minus 1 or equal to the number of the network coverage levels minus 1; and determining the target random access resource information from the random access resource information according to the first receiving power and the random access resource selection criteria threshold.

Alternatively, the determining the target random access resource information from the random access resource information according to the first receiving power and the random access resource selection criteria threshold comprises: determining whether the first receiving power is larger than or equal to each of first random access resource selection criteria thresholds of the random access resource selection criteria thresholds sequentially in accordance with a first preset order; wherein the first preset order is a descending order of the first random access resource selection criteria thresholds; and when the first receiving power is larger than or equal to a first random access resource selection criteria threshold, determining the random access resource information corresponding to the first random access resource selection criteria threshold as the target random access resource information.

Alternatively, the determining the target random access resource information from the random access resource information according to the first receiving power and the random access resource selection criteria threshold comprises: determining whether the first receiving power is smaller than or equal to first random access resource selection criteria thresholds of the random access resource selection criteria thresholds sequentially in accordance with a second preset order; wherein the second preset order is an ascending order of the first random access resource selection criteria thresholds; and when the first receiving power is smaller than or equal to a first random access resource selection criteria threshold, determining the random access resource information corresponding to the first random access resource selection criteria threshold as the target random access resource information.

Alternatively, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises a second random access resource selection criteria threshold in the random access resource selection criteria thresholds corresponding to the power level of the terminal over the uplink frequency range or the uplink carrier or the network coverage level supported by the network side device; the number of the plurality of threshold elements is $A^B$, wherein, A is the number of the uplink frequency ranges or the uplink carriers or the network coverage levels supported at the network side device and B is the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1;

The determining the target random access resource information from the random access resource information according to the first receiving power and the random access resource selection criteria threshold comprises: acquiring the power level of the terminal over the at least one uplink frequency range or over the at least one uplink carrier or the at least one network coverage level; determining a target threshold element from the plurality of threshold elements according to the power level; determining a target random access resource information from the random access resource information according to the first receiving power and the target threshold element.

Alternatively, the determining the target random access resource information from the random access resource information according to the first receiving power and the target threshold element comprises: determining whether the first receiving power is larger than or equal to a second random access resource selection criteria thresholds of the target threshold elements sequentially in accordance with a third preset order; wherein the third preset order is a descending order of the second random access resource selection criteria thresholds; and when the first receiving power is larger than or equal to a second random access resource selection criteria threshold, determining the random access resource information corresponding to the second random access resource selection criteria threshold as the target random access resource information.

Alternatively, the determining the target random access resource information from the random access resource information according to the first receiving power and the target threshold element comprises: determining whether the first receiving power is smaller than or equal to a second random access resource selection criteria thresholds of the target threshold elements sequentially in accordance with a fourth preset order; wherein the fourth preset order is an ascending order of the second random access resource selection criteria thresholds; and when the first receiving power is smaller than or equal to a second random access resource selection criteria threshold, determining the random access resource information corresponding to the second random access resource selection criteria threshold as the target random access resource information.

An embodiment of the present disclosure further provides a terminal 2, which includes:

the above non-transitory computer readable storage medium 1; and one or more processors for executing the program in the non-transitory computer readable storage medium 1.

An embodiment of the present disclosure further provides a non-transitory computer readable storage medium 3, which includes one or more programs for executing a random access method, where, the method includes: determining random access resource selection criterion information and random access resource information; and broadcasting the random access resource selection criterion information and the random access resource information, so that the terminal determines target random access resource information from the random access resource information according to the random access resource selection criterion information and initiates a random access request to the network side device according to the target random access resource information.

Alternatively, the random access resource information comprises a carrier frequency identification within at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

Alternatively, the broadcasting the random access resource selection criterion information and the random access resource information comprises: broadcasting the random access resource selection criterion information and the random access resource information over a target downlink carrier within a downlink frequency range supported by the network side device.

Alternatively, the target downlink carrier within the downlink frequency range is configured by a network management system or the network side device according to network coverage capability of a carrier within the downlink frequency range supported by the network side device; and/or the target downlink carrier within the downlink frequency range is configured by a network management system or the network side device according to load status of a carrier within the downlink frequency range supported by the network side device.

Alternatively, the number of the random access resource selection criteria thresholds included in the random access resource selection criterion information is:

the number of the uplink frequency ranges supported by the network side device minus 1; or the number of the uplink frequency carriers supported by the network side device minus 1; or the number of the network coverage levels supported by the network side device minus 1.

Alternatively, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises a second random access resource selection criteria threshold in the random access resource selection criteria thresholds corresponding to the power level of the terminal over the uplink frequency range or the uplink carrier or the network coverage level supported by the network side device;

the number of the plurality of threshold elements is AB, wherein, A is the number of the uplink frequency ranges or the uplink carriers or the network coverage levels supported at the network side device and B is the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1.

Alternatively, the random access resource selection criteria threshold is obtained through the following steps:

acquiring a first transmission power for the network side device to send the reference signal or the synchronization signal over the target downlink carrier within the downlink frequency range, and a lowest receiving power corresponding to the network side device for demodulating the uplink data when the terminal sends the uplink data over the uplink frequency range supported by the network side device;

acquiring a loss difference value between an uplink path loss value of the terminal and the network side device over the uplink frequency range and a downlink path loss value of the terminal and the network side device over the target downlink carrier, wherein the uplink path loss value and the downlink path loss value are path loss values obtained by the terminal at a same geographical position;

determining all power levels corresponding to the terminal over the at least one uplink frequency range; and obtaining a random access resource information selection threshold powers corresponding to each uplink frequency range though the following formula, according to the first receiving power, the lowest receiving power, the loss difference value and all the power levels:

$$RSRP_{thres}=P_{tx\_1}+PL_{delta}+P_{RX\_i}-P_{UL\_i}$$

wherein $RSRP_{thres}$ represents the random access resource information selection threshold power corresponding to the i-th uplink frequency range, $P_{tx\_1}$ represents the first receiving power, $PL_{delta}$ represents the loss difference value between the uplink path loss value of the terminal and the network side device over the i-th uplink target carrier and a downlink path loss value of the terminal and the network side device over the target downlink carrier, $P_{RX\_i}$ represents the lowest receiving power corresponding to the network side device for demodulating the uplink data when the uplink data are sent over the i-th uplink target carrier supported by the network side device, and $P_{UL\_i}$ represents the maximum transmission power corresponding to any one of all the power levels of the i-th uplink target carrier.

An embodiment of the present disclosure further provides a network side device 4, which includes:

the above non-transitory computer readable storage medium 3; and one or more processors for executing the program in the above non-transitory computer readable storage medium 3.

The preferred embodiments of the present disclosure have been described in details above in connection with the accompanying drawings. However, the present disclosure is not limited to the specific details of the above embodiments, and various simple modifications may be made to the technical solutions of the present disclosure within the scope of the technical idea of the present disclosure. These simple variations all fall within the protection scope of the disclosure.

In addition, it should be noted that the respective specific technical features described in the above specific embodiments may be combined in any suitable manner without contradiction. In order to avoid unnecessary repetition, various possible combination methods will not be described in the present disclosure separately.

Furthermore, any combination may be made between various embodiments of the present disclosure as long as it does not deviate from the idea of the present disclosure, and should also be regarded as contents of the present disclosure.

What is claimed is:

1. A random access method applied to a terminal, comprising:

receiving random access resource selection criterion information and random access resource information broadcasted by a network side device;

determining, from the random access resource information, target random access resource information corresponding to the random access resource selection criterion information; and initiating a random access request to the network side device according to the target random access resource information, wherein, the random access resource information comprises a carrier frequency identification for at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range, or over at least one uplink carrier or at least one network coverage level, wherein, the random access resource selection criteria threshold represents a coverage boundary of the at least one uplink frequency range, or a coverage boundary of the at least one uplink carrier or the at least one network coverage level.

2. The method according to claim 1, wherein, the receiving random access resource selection criterion information and random access resource information broadcasted by a network side device comprises:

receiving the random access resource selection criterion information and the random access resource information broadcasted by the network side device over a target downlink carrier within a downlink frequency range supported by the network side device.

3. The method according to claim 2, wherein, the target downlink carrier within the downlink frequency range is configured by a network management system or the network side device according to network coverage capability of carriers within the downlink frequency range supported by the network side device; and/or the target downlink carrier within the downlink frequency range is configured by a network management system or the network side device according to load status of carriers within the downlink frequency range supported by the network side device.

4. The method according to claim 2, wherein, the determining, from the random access resource information, target random access resource information corresponding to the random access resource selection criterion information comprises:

acquiring a first receiving power for the terminal to receive a downlink reference signal or a downlink synchronization signal by the terminal over the target downlink carrier; and determining the target random access resource information from the random access resource information according to the first receiving power and the random access resource selection criterion information, wherein, the target random access resource information comprises frequency identification of a target uplink carrier, and the random access resource selection criterion information is characterized by the first receiving power.

5. The method according to claim 4, wherein, the determining the target random access resource information from the random access resource information according to the first receiving power and the random access resource selection criterion information comprises:

acquiring, from the random access resource selection criterion information, random access resource selection criteria thresholds corresponding to the terminal over the at least one uplink frequency range or over at least one uplink carrier or at least one network coverage level, the number of the random access resource selection criteria thresholds is equal to the number of the uplink frequency ranges minus 1 or equal to the number of the uplink carriers minus 1 or equal to the number of the network coverage levels minus 1; and determining the target random access resource information from the random access resource information according to the first receiving power and the random access resource selection criteria thresholds.

6. The method according to claim 5, wherein, the determining the target random access resource information from the random access resource information according to the first receiving power and the random access resource selection criteria thresholds comprises:

determining whether the first receiving power is larger than or equal to each of first random access resource selection criteria thresholds of the random access resource selection criteria thresholds sequentially in accordance with a first preset order; wherein the first preset order is a descending order of the first random access resource selection criteria thresholds; and when the first receiving power is larger than or equal to a first random access resource selection criteria threshold, determining the random access resource information corresponding to the first random access resource selection criteria threshold as the target random access resource information.

7. The method according to claim 5, wherein, the determining the target random access resource information from the random access resource information according to the first receiving power and the random access resource selection criteria thresholds comprises:

determining whether the first receiving power is smaller than or equal to first random access resource selection criteria thresholds of the random access resource selection criteria thresholds sequentially in accordance with a second preset order; wherein the second preset order is an ascending order of the first random access resource selection criteria thresholds; and when the first receiving power is smaller than or equal to a first random access resource selection criteria threshold, determining the random access resource information corresponding to the first random access resource selection criteria threshold as the target random access resource information.

8. The method according to claim 5, wherein, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises second random access resource selection criteria thresholds in the random access resource selection criteria thresholds corresponding to the power level of the terminal over the uplink frequency range or the uplink carriers or the network coverage levels supported by the network side device;

the number of the plurality of threshold elements is $A^B$, wherein, A represents the number of the uplink frequency ranges or the uplink carriers or the network coverage levels supported at the network side device and B represents the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1; and the determining the target random access resource information from the random access resource information according to the first receiving power and the random access resource selection criteria thresholds comprises:

acquiring the power levels of the terminal over the at least one uplink frequency range or over the at least one uplink carrier or the at least one network coverage level;

determining a target threshold element from the plurality of threshold elements according to the power levels; and determining the target random access resource information from the random access resource information according to the first receiving power and the target threshold element.

9. The method according to claim 8, wherein, the determining the target random access resource information from the random access resource information according to the first receiving power and the target threshold element comprises:

determining whether the first receiving power is larger than or equal to each of second random access resource selection criteria thresholds of the target threshold elements sequentially in accordance with a third preset order; wherein the third preset order is a descending order of the second random access resource selection criteria thresholds; and when the first receiving power is larger than or equal to a second random access resource selection criteria threshold, determining the random access resource information corresponding to the second random access resource selection criteria threshold as the target random access resource information.

10. The method according to claim 8, wherein, the determining the target random access resource information from the random access resource information according to the first receiving power and the target threshold element comprises:

determining whether the first receiving power is smaller than or equal to each of second random access resource selection criteria thresholds of the target threshold elements sequentially in accordance with a fourth preset order; wherein the fourth preset order is an ascending order of the second random access resource selection criteria thresholds; and when the first receiving power is smaller than or equal to a second random access resource selection criteria threshold, determining the random access resource information corresponding to the second random access resource selection criteria threshold as the target random access resource information.

11. A non-transitory computer readable storage medium, wherein the non-transitory computer readable storage medium comprises one or more programs which, when executed by a processor, cause the processor to carry out the random access method according to claim 1.

12. A random access method applied to a network side device, comprising:
  determining random access resource selection criterion information and random access resource information; and
  broadcasting the random access resource selection criterion information and the random access resource information, so that a terminal determines target random access resource information from the random access resource information according to the random access resource selection criterion information and initiates a random access request to the network side device according to the target random access resource information,
  wherein, the random access resource information comprises a carrier frequency identification for at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range, or over at least one uplink carrier or at least one network coverage level, wherein, the random access resource selection criteria threshold represents a coverage boundary of the at least one uplink frequency range or a coverage boundary of the at least one uplink carrier or the at least one network coverage level.

13. The method according to claim 12, wherein, the random access resource selection criteria threshold is obtained through the following steps:
  acquiring a first transmission power for the network side device to send the reference signal or the synchronization signal over the target downlink carrier within the downlink frequency range, and a lowest receiving power corresponding to the network side device for demodulating the uplink data when the terminal sends the uplink data over the uplink frequency range supported by the network side device;
  acquiring a loss difference value between an uplink path loss value of the terminal and the network side device over the uplink frequency range and a downlink path loss value of the terminal and the network side device over the target downlink carrier, wherein the uplink path loss value and the downlink path loss value are path loss values obtained by the terminal at a same geographical position;
  determining all power levels corresponding to the terminal over the at least one uplink frequency range; and
  obtaining a random access resource information selection threshold powers corresponding to each uplink frequency range though the following formula, according to the first receiving power, the lowest receiving power, the loss difference value and all the power levels:

$$RSRP_{thres}=P_{tx\_1}+PL_{delta}+P_{RX\_i}-P_{UL\_i}$$

wherein $RSRP_{thres}$ represents the random access resource information selection threshold power corresponding to the i-th uplink frequency range, $P_{tx\_1}$ represents the first receiving power, $PL_{delta}$ represents the loss difference value between the uplink path loss value of the terminal and the network side device over the i-th uplink target carrier and a downlink path loss value of the terminal and the network side device over the target downlink carrier, $P_{RX\_i}$ represents the lowest receiving power corresponding to the network side device for demodulating the uplink data when the uplink data are sent over the i-th uplink target carrier supported by the network side device, and $P_{UL\_i}$ represents the maximum transmission power corresponding to any one of all the power levels of the i-th uplink target carrier.

14. The method according to claim 12, wherein, the broadcasting the random access resource selection criterion information and the random access resource information comprises:
  broadcasting the random access resource selection criterion information and the random access resource information over a target downlink carrier within a downlink frequency range supported by the network side device.

15. The method according to claim 14, wherein, the target downlink carrier within the downlink frequency range is configured by a network management system or the network side device according to network coverage capability of a carrier within the downlink frequency range supported by the network side device; and/or
  the target downlink carrier within the downlink frequency range is configured by a network management system or the network side device according to load status of a carrier within the downlink frequency range supported by the network side device.

16. The method according to claim 15, wherein, the number of the random access resource selection criteria thresholds included in the random access resource selection criterion information is:
  the number of the uplink frequency ranges supported by the network side device minus 1; or
  the number of the uplink frequency carriers supported by the network side device minus 1; or
  the number of the network coverage levels supported by the network side device minus 1.

17. The method according to claim 16, wherein, the random access resource selection criterion information comprises a threshold sequence, the threshold sequence comprises a plurality of threshold elements, the threshold elements are in one to one correspondence with all of the level combinations of the power levels corresponding to the terminal over each uplink frequency range or each uplink carrier or each network coverage level supported by the network side device, and each threshold element comprises a second random access resource selection criteria threshold in the random access resource selection criteria thresholds corresponding to the power level of the terminal over the uplink frequency range or the uplink carrier or the network coverage level supported by the network side device; and
  the number of the plurality of threshold elements is $A^B$, wherein, A is the number of the uplink frequency ranges or the uplink carriers or the network coverage levels supported at the network side device and B is the number of the power levels of the terminal over the uplink frequency ranges or the uplink carriers or the network coverage levels; the number of the second random access resource selection criteria thresholds included in each threshold element is the number of the uplink frequency ranges supported by the network side device or the number of the uplink carriers or the network coverage levels minus 1.

18. A terminal, comprising: one or more processors; and a non-transitory computer readable storage medium for storing one or more programs, when being executed by the processors, the computer program implements a random access method, comprising:
receiving random access resource selection criterion information and random access resource information broadcasted by a network side device;
determining, from the random access resource information, target random access resource information corresponding to the random access resource selection criterion information; and
initiating a random access request to the network side device according to the target random access resource information,
wherein, the random access resource information comprises a carrier frequency identification for at least one uplink frequency range supported by the network side device or a center frequency of an uplink carrier within the at least one uplink frequency range; the random access resource selection criterion information comprises a random access resource selection criteria threshold corresponding to the terminal over the at least one uplink frequency range, or over at least one uplink carrier or at least one network coverage level, wherein, the random access resource selection criteria threshold represents a coverage boundary of the at least one uplink frequency range, or a coverage boundary of the at least one uplink carrier or the at least one network coverage level.

* * * * *